May 28, 1940.　　　A. U. BROUNE　　　2,202,621

FUSE OPERATED ELECTRIC CIRCUIT CONTROL DEVICE

Filed Feb. 20, 1937　　　3 Sheets-Sheet 1

INVENTOR.
Abel U. Broune
BY
ATTORNEY.

May 28, 1940.  A. U. BROUNE  2,202,621
FUSE OPERATED ELECTRIC CIRCUIT CONTROL DEVICE
Filed Feb. 20, 1937  3 Sheets-Sheet 2
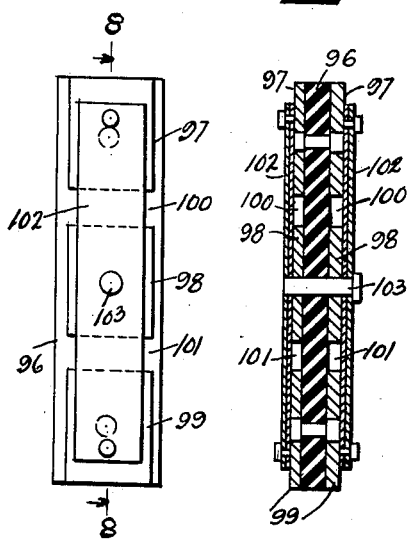
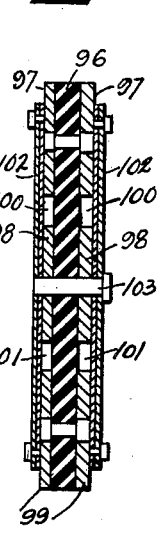
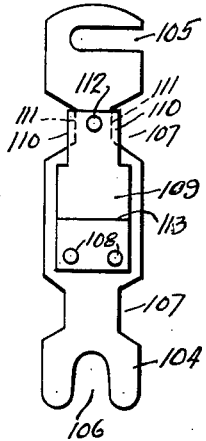
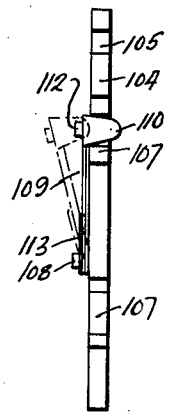
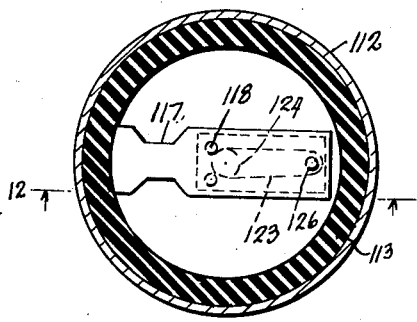
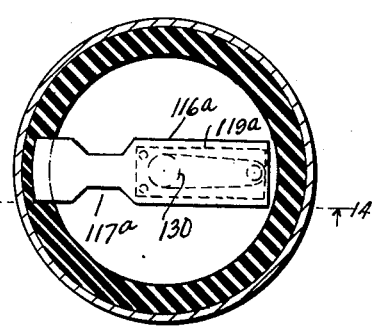
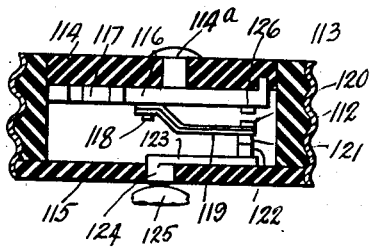
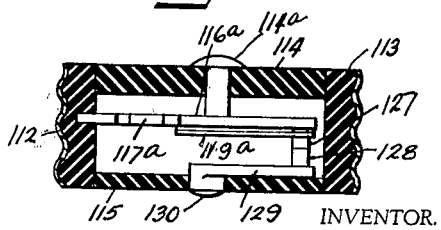
INVENTOR.
Abel U. Broune
BY
ATTORNEY.

May 28, 1940.　　　A. U. BROUNE　　　2,202,621
FUSE OPERATED ELECTRIC CIRCUIT CONTROL DEVICE
Filed Feb. 20, 1937　　　3 Sheets-Sheet 3
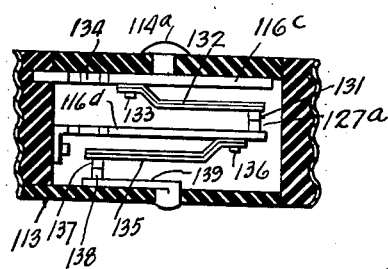
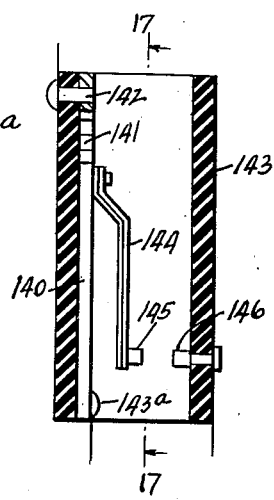
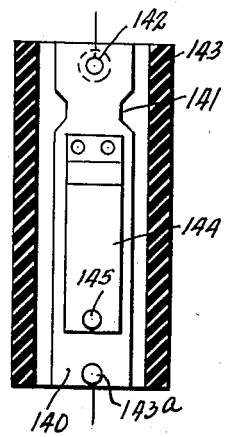
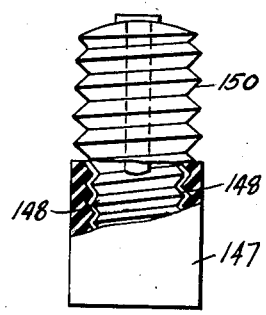
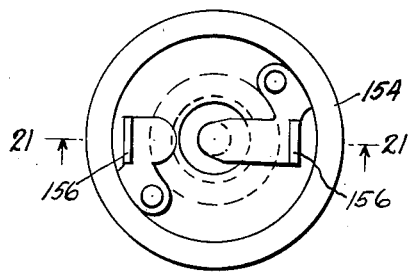
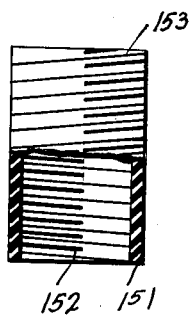
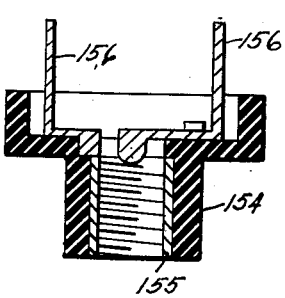
INVENTOR.
Abel U. Broune
BY
ATTORNEY.

Patented May 28, 1940

2,202,621

UNITED STATES PATENT OFFICE 2,202,621

FUSE OPERATED ELECTRIC CIRCUIT CONTROL DEVICE

Abel U. Broune, Brooklyn, N. Y.

Application February 20, 1937, Serial No. 126,800

3 Claims. (Cl. 200—113)

This invention relates to electric load control systems and, more particularly, to electrically operated apparatus and controlled signal devices installed in varied electric circuits and systems with the adaptation of this invention.

One of the objects of the invention is to combine a fuse element and a bi-metal element, both being in synthermal relationship in varied electrically controlled systems and devices and, more specifically, in devices as applied and shown in the accompanying drawings; creating in certain devices and/or electric systems a signal function; in other devices and/or electric systems a vibrating or oscillating function; in other devices and/or electric systems a flasher function; in other devices and/or electric systems a circuit breaking function; and in other devices and/or electric systems thermostatic functions, effects, combinations and objectives.

Another object of the invention is to provide a high-resistant fuse element or fuse alloy with a bi-metal unit, or strip in an electric circuit or device, to effect different electrical and mechanical results in combination. While the fuse element and bi-metal combination of this invention may be devised for use as a fuse to break open an overloaded electric circuit in certain instances, it is, however, specifically intended as a new arrangement, use and adaptation in certain electrical devices as a new means to perform similar electrical effects and results as is now generally effected in certain devices only through the mediums of heating coils, resistance units, magnetic relays, solenoids, and other electrical means. It is therefore an object of this invention to replace in certain electrical apparatus such heating coils, resistances, electro-magnetic devices, etc., with this high resistant fuse alloy and bi-metal combination, which will permit and offer simpler constructed devices, much less costly to manufacture and offering greater flexibility and replacement of parts, when such replacements become necessary.

Another object of this invention is to effect systems that are predetermined and periodically controlled either in single pole or a multi-pole control, either in constant current circuits, or in flasher circuits, adaptations of which may be applied to mechanical and electrical devices embodying the principle of this invention.

Other objects and advantages will appear as the nature of the improvements is better understood.

The disclosure made the basis of exemplifying the present inventive concepts suggests a practical embodiment thereof, but the invention is not to be restricted to the exact details of this disclosure, and the latter, therefore, is to be understood from an illustrative, rather than a restrictive standpoint.

In the accompanying drawings Figure 1 is a front view, partly diagrammatic of my improved fuse as applied to a motor control system showing three such fuses in the circuit.

Fig. 7 is a front view of a modified form of the fuse element and bi-metal element combination.

Fig. 8 is a sectional view thereof taken on line 8—8 Fig. 7.

Fig. 9 is a still further modified form of the fuse and bi-metal element combinations.

Fig. 10 is a side view thereof looking from the right of Fig. 9.

Fig. 11 is a cross sectional view showing one form of my bi-metal and fuse element combination as applied to a plug adapted to be inserted into an electric lamp socket.

Fig. 12 is a sectional view thereof taken on line 12—12 Fig. 11.

Fig. 13 is a view similar to Fig. 11 of a modified form of the combination shown in Fig. 11.

Fig. 14 is a sectional view thereof taken on line 14—14 Fig. 13.

Fig. 15 is a cross sectional view of a still further modified form of my invention as illustrated in Figs. 11 to 14.

Fig. 16 is a longitudinal sectional view of a still further modified form of my fuse.

Fig. 17 is a sectional view thereof taken on line 17—17 Fig. 16.

Fig. 18 is a side view partly in section of one form of fuse end used in connection with my improved fuse.

Fig. 19 is a side view partly in section of a modified form of such end.

Fig. 20 is a top plan view of a still further modified form of such fuse end and, Fig. 21 is a sectional view thereof taken on line 21—21 Fig. 20.

Figure 1:
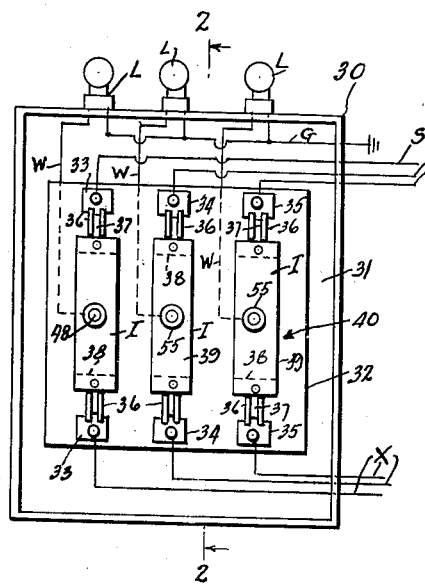

Referring now to the drawings in detail 30 illustrates a fuse or a cut-out box which may be made of any suitable metal. The said box 30 has secured to the base 31 thereof an insulating block 32 to which may be secured a plurality of fuse clips arranged in pairs 33—33, 34—34, 35—35. The said clips are each provided with a pair of prongs 36 adapted to receive the knife blades 37 forming part of caps 38 secured to the ends of the outer shell 39 of my improved knife blade fuse 40.

While I designate knife blade type fuses, it is understood that I may employ this principle in combination with fuses having no knife blades, or employ same in plug type fuses, or enclosures of any particular design or construction.

Figure 3:
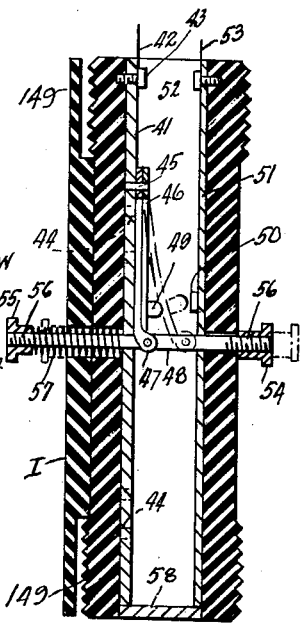
Fig. 3 is a longitudinal sectional view through one of the fuse members.

The fuse members illustrated in Figs. 1 and 3 enclosed in the said shells 39 may comprise a fuse element 41 to which is secured one end of a wire 42 forming one leg of an electric circuit, the said wire 42 being electrically connected to the fuse element 41 at 43. The said fuse-element or alloy has a high electric resistance and is so constituted in an electric device, that its current-carrying characteristics is in variance electrically and structurally with the other current carrying parts of the circuit or device immediately in series with it. Because of this situation, the fuse-alloy heats up at its weakest structure or volatilization point, developed by either its inert or fusible resistance, or by its dimensional changes of size, thickness, length, design, construction, or combination of fuse alloys. Secured at 45 to the fuse element 41 is a bi-metal element 46 which at its opposite end may be secured by means of a pin 47 or any other suitable means to a rod or shaft 48 slidably mounted in the shell 39. The bi-metal element 46 may be provided intermediate its ends with a contact point 49 adapted when in warped or expanded position to contact with a contact point 50 secured to a metal strip 51 to one end of which there is secured at 52 a second leg or wire 53 of the electric circuit. The rod 48 is provided at one end thereof with a contact member 54 and at its opposite end with a knob 55. The said rod may be provided at both ends thereof where the members 54 and 55 are mounted with threaded portions 56 so that the said members 54 and 55 may be adjusted. A coiled spring 57 may be provided for more rapidly returning the bi-metal element 46 to normal position after it has warped. The metal strip 51 is electrically connected to the fuse element 41 by a cross bar 58. In this form of my invention the operation is as follows. The current entering through the wire or leg 42 will heat up the fuse element and particularly at its weakened areas 44 and simultaneously therewith also heat up the bi-metal element 46 which is secured thereto and cause the bi-metal element to warp sufficiently so that the contact points 49 and 50 touch each other. In doing so it shunts the current from the fuse element at a point above the calibrations or weakened areas 44 across through the contact points 49 and 50 to the metal strip 51. In this momentary contacting position the current passes through the bi-metal and not the fuse element at its calibration the current taking the path of least resistance, thus permitting a cooling effect upon the fuse member and due to this cooling the bi-metal will momentarily return to its normal position aided by the action of the spring 57. This make and break operation is continuous, causing a flasher effect in the circuit and at the same time giving a vibratory effect on the rod or shaft 48.

The expansion or warping of the bi-metal element 46 and the movement of the rod 48 in each of the fuses causes the contacts 54 to engage contacts 54a at the rear of the fuse block, the said contacts 54a each being connected by a wire W to a signal lamp L. The other terminal of the lamp L is connected to a ground by means of a wire G or through the means of the opposite polarity in the system. The current supplied in this system is carried to the fuse clips or terminals by means of wires S and out therefrom by means of wires X. It is to be noted, however, that the current that signals the lamp is entirely separate and distinct from the current flowing in the circuit and only becomes operative when and if the bi-metal member in the fuse warps sufficiently to make the contacts as described above.

Figure 2:
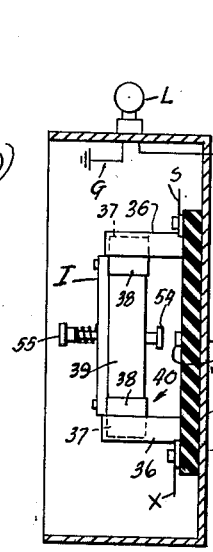
Fig. 2 is a sectional view thereof taken on line 2—2 Fig. 1.

It will be noted by referring to Figs. 1, 2 and 3 that I have provided an insulating strip I which is long enough to overlie the shell 39 as well as the caps 38 so as to completely insulate the fuse at the front thereof.

Figure 4:
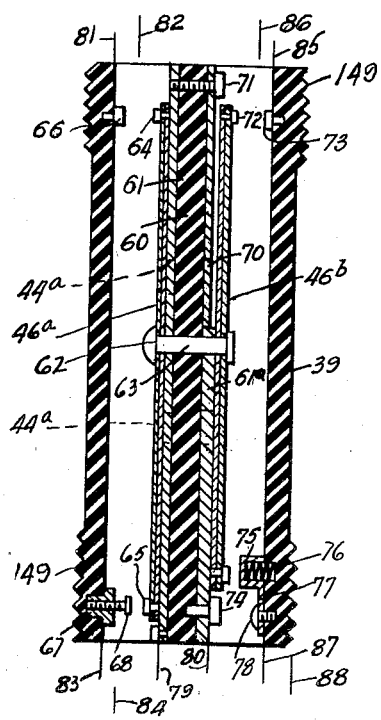
Fig. 4 is a sectional view through a modified form of such fuse.

In Fig. 4 I have shown a modified form of my invention wherein the shell 39 is provided with an interior insulating wall 60 to one side of which there is secured a fuse element 61 having the notches or weakened areas 44a. A bi-metal element 46a is secured to the said fuse element 61 at 62 by means of a headed pin or rivet 63, the bi-metal element 46a in this instance overlies both the weakened areas 44a and is provided with contact points 64 and 65, one at one end thereof and the other at the opposite end thereof. A contact point 66 is secured to the inner portion of the shell 39 opposite the contact 64 and a bushing 67 having an adjustable contact point 68 is provided at the opposite end of the shell in line with the contact point 65. Carried by the stud or rivet 63 on the opposite side of the wall 60 is a second fuse member 61a to which is secured a bi-metal member 46b. The fuse member 61a is shorter than the fuse member 61 and is in contact with a metal strip 70 which is secured to the top of the wall 60 by means of a screw 71. The bi-metal member 46b is provided at the top thereof with a contact point 72 which, when the said bi-metal member is in warped position, will come in contact with a contact point 73 secured to the shell 39 opposite the point 72. The lower end of the bi-metal member 46b is provided with a contact point 74 which is adapted to contact with a resiliently mounted contact point 75 near the bottom end of the shell 39, the said resiliency being provided by means of a spring 76 which may be suitably secured to the shell at one end thereof and exerts a tension against the contact 75. The said resiliently mounted contact 75 is provided with an extension 77 which is secured to the bottom of the shell 39 by means of a screw 78.

In this form of my invention I have shown a device adapted to be used in connection with four different electrical constructions, each functioning for a different purpose. It is to be noted, that whereas in Fig. 4 is shown a structure having four different functions, that in actual application, I can adopt one or more or any structural combinations and effects best suited for a particular device for manufacture or a circuit under control therewith. Current is supplied to the device through a feed wire 79, the said current passing through fuse 61, then through the screw 71, through the metal plate 70, thence through the fuse 61a and out through a wire 80. As the current passes through in this form it acts upon the fuse members and bi-metal members secured thereto in four different ways. At the upper portion the bi-metal 46ª responds in a flasher effect, the current being shunted when cold at the fuse calibration by the bi-metal 46ª momentarily. As soon as the fuse heats up, the bi-metal warps away and closes the circuit at 64 and 66 through a wire 81 completing this particular circuit with the ground wire 82.

In the lower section the bi-metal member 46ª will expand in direct ratio to the imposed current flowing through this particular section and as it warps sufficiently to contact 68, it acts as a switching means to a circuit, being completed through wires 83 and 84, 84 being the neutral or ground wire.

On the upper right hand side of this device is shown a construction of the bi-metal 46ᵇ operative only thermostatically and not with respect to the current flowing in the system. The circuit is completed in this instance through a live wire 85 and ground wire 86.

In the lower right hand section of the device, the bi-metal 46ᵇ functions in a vibratory manner, as the current passes through the fuse elements 61ª it is shunted by the bi-metal member 46ᵇ when cooled but as soon as the fuse member 46ᵇ heats up by the current flowing through it, the bi-metal member 46ᵇ warps away sufficiently so that the contact 74 engages the resilient spring contact 75 as aforementioned. The circuit in this instance is completed by means of a live wire 87 secured to the terminal screw 78 and a ground wire 88.

Figure 5:
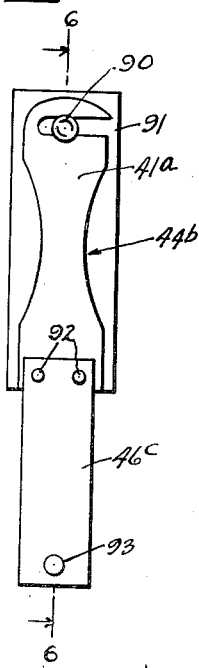
Fig. 5 is a front view of one form of fuse element and bi-metal element connected thereto.
Figure 6:
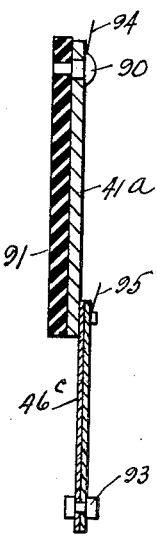
Fig. 6 is a sectional view thereof taken on line 6—6 Fig. 5.

In Figs. 5 and 6 I have shown a modified form of the fuse and bi-metal element combination. In this form of the invention I have shown a fuse element 41ª which may be secured by means of a stud 90 to an insulating plate 91 and having a bi-metal strip 46ᶜ secured to one end thereof by rivets or studs 92, the said securing means being combined with any part of fuse element or below the weakened or cut-out portion 44ᵇ. The bi-metal element 46ᶜ is provided at its free end with a contact point 93 which is adapted, when the said lower end of the bi-metal becomes heated and warps away from the fuse element, to contact any suitable circuit closing means. The current is supplied to this form of the invention by means of a feed wire 94, the current passing through the fuse strip 41ª and out through a wire 95. I desire it understood that the bi-metal element may warp either to the right or to the left of its normal Fig. 6 position, depending upon which surface thereof contacts the fuse strip 41ª, and may be made to cause an oscillation of a mechanical means or combination designed therewith.

In Figs. 7 and 8 I have shown a further modified form of the fuse and bi-metal element combinations. In the form herein shown the fuse comprises a backing 96 made of suitable insulating material and may be provided on either side thereof with top fuse sections 97, central fuse strips 98 and bottom fuse strips 99, the said strips may be joined together or separated one from the other by gaps 100 and 101 and forming a series of fuse areas on either side of the central insulating strip 96. Each series of fuse strips is provided with a bi-metal member 102, the said bi-metal strips being secured at their center to the insulating block strip 96 by means of a pin or rivet 103. In this form of the invention the device acts as two-fold switches when the bi-metal elements become heated and warped from the upper and lower fuse sections.

In Figs. 9 and 10 I have shown a still further modified form of fuse and bi-metal element combination. In the form presented in the above mentioned views, the fuse comprises a fuse strip 104 provided with means or slots 105 and 106 for inserting or connecting same to two ends of any fuse. The said fuse element 104 may be of one piece fuse strip, that is without calibration or may be provided in this instance with a plurality of weakened areas 107 and has secured thereto at 108 a bi-metal member 109 having projections or slips 110 which engage the side edges 111 of the upper ampere rating calibration or the weakest areas 107 and the said element 109 is further provided with a contact point 112 adapted when the element is in a warped position to close an independent electric circuit. For more readily returning the element 109 to its normal position after it is cooled off, I provide a spring plate 113 at the bottom thereof. The projections 110 may be shaped in any form or combined with a fuse element in any desired thermostatic combination provided so that when the bi-metal element becomes heated, it will provide means for delaying the breaking or fusibility in the circuit and the consequent volatilizing of the fuse at that junction.

In Figs. 11 and 12 I have shown my invention as applied to a fuse plug insertable into an electric socket and is provided with screw means 112 for that purpose, the said screw means being in the form of a cylindrical screw threaded section which passes over the exterior insulating tubular portion 113. The said tubular portion may be closed at one end by an insulating disk 114 and at its opposite end by a disk 115. Secured to the upper disk 114 and in contact with a metal stud 114ª which contacts one pole of the electric socket (not shown) is a fuse strip 116 having a calibration or weakened area 117 near one end thereof. Secured to the fuse element 116 by means of pins or rivets 118 is a bi-metal strip 119 provided at its free end with an inner contact point 120 and an outer contact point 121, the said contact point 121 being normally, when the bi-metal strip is in a cold state, in contact with a contact point 122 carried by a metallic strip 123 terminating in a protuberance 124 which extends through the wall or disk 115 and is in contact with, for example, the base 125 of a lamp. In the form shown in this modified form of the invention, the electric current enters the fuse member 116 through the stud 114ª and when cold it passes through the bi-metal element through contacts 121, 122, strip 123 and contacts 124 to the base of the lamp 125. However, when the bi-metal element becomes heated it will move backwardly until the contact 120 contacts a contact point 126 on the fuse member 116. As it does so, the calibration 117 heats up and simultaneously causes the bi-metal to warp backward, thus breaking the contact between contacts 121 and 122, causing the light or lamp to flicker when the bi-metal again becomes cold and returns rearwardly, causing a continuous flickering or flashing.

In Figs. 13 and 14 I have shown a still further modified form of my invention wherein the fuse element 116ª carries at its free end a contact point 127 which is normally in contact with a contact point 128 carried by a strip of metal 129 terminating in a cylindrical extension 130 which may contact one terminal of any electrical apparatus, as, for instance, a lamp or the like. Secured to the fuse element 116ª to the right of the calibration 117ᵃ is a bi-metal strip 119ᵃ. In this form of the invention, when the fuse strip 116ᵃ and bi-metal strip 119ᵃ become heated, they will warp rearwardly to break the contact between points 127 and 128 and when cooled will return to their normal position, thus causing a flickering of the lamp to which it is connected in the circuit.

In the form of my invention shown in Fig. 15, in addition to the fuse element 116ᶜ, I provide a second fuse element 116ᵈ, the said element 116ᵈ being secured to the side of the insulating ring 113 and provided at its free end with a contact point 127ᵃ which is normally in contact with a contact point 131 secured to the free end of a bi-metal member 132, in turn secured at 133 to the fuse element 116ᶜ to the right of the calibration 134. A second bi-metal element 135 is secured to the free end of the fuse strip 116ᵈ at 136 and is provided at its free end with a contact point 137 normally in engagement with a contact point 138 carried by a metal contact member 139. This double arrangement of fuse members and bi-metal members in combination may be combined in series or parallel construction in an electric device to give a double flasher effect, or break the circuit at any predetermined arrangement; depending upon the structural combination of the fuse members and bi-metal members mutually and integrally combined.

In Figs. 16 and 17 I have shown a still further modified form of the invention wherein I provide a fuse member strip 140 having the usual calibration 141, the said fuse member being connected at 142 to an insulating shell 143 at one end thereof and provided with an electric terminal 143ᵃ. Secured to the fuse element or strip 140 below the calibration 141 is a bi-metal strip 144 having a contact point 145 at its free end which, when the bi-metal element 144 is in heated and warped position, will contact a contact point 146 to close an independent electric circuit.

In Fig. 18 I have shown one form of cap which may be used in connection with my improved fuse. The said cap comprises a tubular portion 147, preferably made of suitable insulating material having an inner thread with which there is screw-threadedly connected a shell 148 adapted to receive the threaded portion 149 of the shell 39 shown in Figs. 3 and 4. The shell 148 extends outwardly and forms an extension 150 which may be screwed into any standard electric socket.

In Fig. 19 I have shown a modified form of fuse cap which consists of a tubular section 151 having an inner thread 152 and an outer thread 153, the inner thread forming means for connecting the said cap to the threaded portions 149 of the fuse shell and the outer thread forming means for threading the said cap into any electric outlet or fixture.

In Figs. 20 and 21 I have shown a further modified form of fuse cap, the said modification comprising an outer insulating plug member 154 provided with an inner metallic tubular member 155 for engagement with the threaded portions 149 of the fuse shell and further provided with prongs 156 for engagement with the standard make of electrical receptacles commonly used.

The above description of this invention as shown in the various modifications embodies the principle of the use and application of a fuse member having a bi-metal member secured thereto, both fuse element and bi-metal installed in a device for electric circuit. When the current flows in an electric circuit, it of course flows through the fuse element and when it reaches the reduced portion of the fuse element at the rated ampere calibration, causes that calibration to heat up, first, because of its reduced metallic size and, secondly, because of the inherent qualities of the alloys contained in the fuse member and, because of the latter two reasons, sets up an electric resistance or ohmage which heats up the fuse and simultaneously heats up the bi-metal member for the purpose of creating an oscillation or warping. It will further be understood that upon the fluctuation of the current flowing through the circuit due to an increased or decreased ampere load, the bi-metal will function either expanded or contracted either outwardly or inwardly, and also depending upon which particular surface thereof is predeterminately in contact with the fuse member. Furthermore, this invention can be combined in numerous electric circuits and devices and perform various electrical or mechanical functions due to this warping or movement of the bi-metal member alined with the fuse member.

Having described my invention, what I claim as new and desire to cover by Letters Patent is:

1. A fuse, comprising a central fuse section, a top fuse section, a bottom fuse section, the said fuse sections being spaced apart to form gaps therebetween, and a bi-metal strip secured to the central fuse section and overlapping the other fuse sections and adapted to warp away from the said top and bottom sections when heated.

2. A flasher device for an electric circuit, comprising an insulator disk-shaped body adapted to fit into a light socket, and having an interior opening, a fuse element fixed to one side of said opening, a bi-metal strip secured to said fuse element and having a fixed contact thereon, a cooperating contact on the opposite side of the interior opening to contact the free end of said bi-metal strip, said fuse element, bi-metal and contact being electrically connected to cause periodic interruptions of said circuit.

3. In combination a fuse comprising an insulated enclosure, metallic caps at each end thereof, a fusible strip in electric contact with the caps and a bi-metal expansible strip secured to said fuse element, a separate attachable insulated member on the exterior of said enclosure, extending the entire length and width of said enclosure and having adjustable metallic screw means transversely through said insulated member and insulated enclosure in engagement with bi-metal member when the latter is heated and warped, said metallic screw means being adapted on the outside of said enclosure for connection to an independent circuit.

ABEL U. BROUNE.